Patented Apr. 27, 1954

2,676,929

UNITED STATES PATENT OFFICE 2,676,929

STOCK MATERIAL FOR MICROPOROUS ARTICLES AND METHODS OF MAKING THE SAME FROM STARCH AND POLYETHYLENE

Joseph C. Duddy, Langhorne, Pa., assignor to The Electric Storage Battery Company, a corporation of New Jersey No Drawing. Application August 23, 1951,
Serial No. 243,356

12 Claims. (Cl. 260—2.5)

This invention relates to methods of producing a stock material for the production of microporous articles, the stock material itself being a new product which when made microporous results in microporous articles of a kind not heretofore known in the art.

The present invention relates generally to the production of microporous articles and incorporates certain features disclosed in United States Letters Patent No. 2,542,527, issued February 20, 1951. The thermoplastic microporous articles disclosed in that patent leave something to be desired in resistance to chemical attack. The suggestion has heretofore been made that the thermoplastic resin, polyethylene, represents a desirable material for the production of thermoplastic articles and there have been disclosed methods of producing such articles by mixtures of starch, polyethylene and a solvent or temporary plasticizer. However, great difficulty arises in practicing such a process because of the fact that polyethylene is not soluble by temporary plasticizers at normal temperatures and, hence, the mixing and temporary plasticization of the polyethylene must be carried out at relatively high temperatures, of the order of 200° F. and upwardly. However, after plasticization of the polyethylene at such elevated temperatures and even after the plasticized mass is formed as by extruding or calendering into shaped articles, upon cooling of the articles to room temperature they have insufficient strength to be self-supporting and far less strength than is required in handling them for the further processing required to make them microporous, as by removal of the starch. It has been proposed directly to mix a 2:1 ratio of starch and polyethylene at temperatures from about 300° F. to about 320° F., but the result is stated to be a product of low porosity and the feasibility of such mixing in the absence of the present invention is seriously questioned.

It has been found that the commercial grade of starch in any desirable quantity, even in ratio of from 1:1 part by weight to the polyethylene, cannot be blended together by any stirring or kneading process in which the exposed area of the mixture is small though the temperature be elevated to within the range of from 300° F. to 320° F. When the temperatures are above the boiling temperature of water the starch particles begin to lose moisture. With temperatures as high as 250° F. and above, there is loss from the starch molecules of associated water. Partial loss of such water at such temperatures causes disruption of the matrix and prevents adhesion of the particles necessary to produce the extrudable dough.

In accordance with the present invention, it has been found that starch can be blended with the thermoplastic resin, polyethylene, and thoroughly dispersed therethrough if at an elevated temperature, preferably at about 240° F. and within the range of from 220° F. to 250° F., there be constantly applied to the mixture a wiping action under pressure which repeatedly subjects the mixture to shearing forces apparently necessary to produce a thorough coating of the starch particles by the softened thermoplastic resin. It is also necessary that the absorbed or adsorbed moisture of the starch be reduced until it will no longer interfere with the cohesion of the mass during mixing. This can be done by controlled heating or "ovening," or by providing a large exposed area of the mass during the mixing and pressure-wiping action for egress of moisture. When the moisture is lowered by vapor removal, the sheeting of the mixture proceeds to form the new product.

In practicing the invention, finely divided or powdered starch can be mixed with powdered or finely divided polyethylene and the mixture fed to differentially operating rollers maintained at a temperature adequate to raise the temperature of the mixture within said range of from 220° F. to 250° F. The heated, differentially operating, rollers "film" the mixture, producing about one of the rolls an endless film repeatedly subjected to a wiping action which produces shearing forces apparently necessary to insure the thorough coating of the starch particles by the softened polyethylene and to lower the moisture content to the needed value.

The method may also be practiced by first "filming" the polyethylene and then feeding the starch between the differentially operating rollers to blend it into the film. After the blending has been completed, requiring a wiping action under elevated temperature for a short period of time, from five to fifteen minutes, at 240° F. for a 4:1 ratio of starch to thermoplastic resin, the film is removed from the differential rolls as an end product of thermoplastic stock suitable for the production of microporous articles.

The stock material after it cools to room temperature has more than adequate strength to be self-supporting. It is a relatively strong material, the strength being more than is needed in subsequent steps of producing microporous articles. The stock material may be cooled to room temperature as in a closed container impervious to moisture to prevent ingress of moisture. The further steps of the process can at any later time be performed. After cooling, the stock material may be pelletized, shredded or fragmented. After fragmentation, the fragments do not tend to adhere together but remain in suitable condition for gravity feed to an extruder operating at a preferred temperature of about 250° F., but within the range of 220° F. to 250° F. to produce shaped articles ready for the additional steps of rendering them microporous.

Finely divided starch as it is commercially available contains a substantial amount of water, of the order of five per cent minimum. If not removed, such a high water content would, under the high temperature conditions necessary for extruding, form steam at rupturing pressures which would make impossible the extrusion of a solid article. However, by carrying out the blending operation at a temperature within the above-indicated range and under the shearing action of the differentially operating rollers, and because of the relatively large area of the exposed film, there is accomplished a highly efficient removal of moisture with reduction of the water content of the stock material below that which interferes with extrusion at high temperatures. Where microporous articles are to be produced of a form determined by the shaping of calendering rolls, it is preferred to remove the heated material from the differential rolls and feed it directly to the calendering rolls without material reduction of temperature.

After the initial moisture removal, and the coating of the starch particles has been completed, the pressure-working of the material may be continued. Water-of-association will be gradually reduced. Its rate of egress will increase as the temperature is gradually increased from the preferred value of 240° F. The rise is limited to about 270° F. until the water-of-association has been reduced to a value which will not cause blistering or rupture of the sheeted material. Thereafter the temperature may be further increased, a step sometimes desirable when partial or complete dextrinization of the starch is desired. Partial dextrinization provides a soluble filler distributed throughout the mass and upon later removal leaves strain-relieving voids which minimize rupture due to the great expansion of the starch particles in the compacted structure.

Of course, the water-of-association may be removed from the sheeted material, shredded or in strip form, in a temperature-controlled oven. When the total moisture content is brought to a low value, the sheet, after shredding, may be extruded at the dextrinization temperature, in the range of from about 270° F. to 400° F., simultaneously to dextrinize the desired amount of starch, the time-temperature relation determining the degree of dextrinization.

Further in accordance with the invention, it is preferred that the calendering take place at the same temperature as, or higher than, that utilized in the mixing operation. It has been found that if that condition be met, the shaped article will be thermally stable. That is to say, it will not after the starch removal steps tend to shrink or otherwise be subject to dimensional change. In this connection the end product is also of differing character than that of said patent not only by reason of the different thermoplastic resin utilized, but also in the following respects. After the expansion of polyvinyl chloride by the swelling of the starch particles, subsequent elevation of the temperature of the polyvinyl chloride causes a reduction in dimensions, a shrinkage, to a size less than that existing after the shaping operation and before the swelling of the starch particles. The shrinkage to less than the original dimensions is believed due to characteristics of the polyvinyl chloride and possibly due to the fact that the removal of the temporary plasticizer leaves a multiplicity of voids throughout the material which, upon reduction of size during shrinkage, causes the dimensions of the final product actually to be less than before the starch-swelling step. Added to the above factors is the fact that for an equivalent porosity a greater ratio of starch to resin must be utilized with polyvinyl chloride to produce an equivalent porosity as attained in accordance with the present invention. The present polyethylene material during the starch-swelling step greatly increases in dimensions due to the multiplicity of enlarged pores formed by each swollen starch particle. With the starch removal step conducted at elevated temperature, the microporous structure shrinks but not to the same degree as with polyvinyl chloride, and it does not shrink to overall dimensions less than the shaped article prior to the starch-expanding step. This difference may be attributed to a viscous flow or deformation of polyethylene during the starch-swelling step, in contrast with the stretching of the polyvinyl chloride with retention of elasticity which acts not only to oppose the expansion but also to increase the shrinkage in the manner above explained.

While the present process has certain features in common with said United States Letters Patent above referred to, the steps outlined above have been found to be essential in the present process of producing an end product of wholly differing character than that produced in accordance with said patent.

The starch-swelling step itself for certain end products of substantially uniform thickness or section, such as sheets, storage battery separators, and the like, may be the same as disclosed in said patent; namely, immersion of the shaped stock material in water maintained at approximately its boiling point. After immersion therein for a period of time commensurate with the thickness thereof, for storage battery separators of the order of one-half hour, the shaped article with the starch particles expanded is then immersed in a dilute solution of acid such as sulphuric acid of 2% to 3% maintained at approximately 210° F., which hydrolyzes and solubilizes the starch, the time required for removal thereof again depending upon the thickness of the shaped article. For storage battery separators the time required is of the order of fifteen minutes. After removal of the starch the shaped article is thoroughly washed and there may be utilized prior to the washing step a treatment in an alkaline solution, such as a 2% sodium hydroxide solution maintained at a range from about 160° F. to 210° F., to insure removal of any vestige of starch retained in the pores and not removed in the acid-treating step.

For storage battery applications it will be desirable to add a wetting agent by immersion of the washed shaped articles in an alkaline solution which will itself serve as the wetting agent, or well-known wetting agents may be utilized, such as an alkyl aryl polyether alcohol sold under the trade-name "Triton," or a wetting agent of the alkyl aryl sulphonate type may be used.

The starch-swelling and starch-removal steps of the above patent may not be utilized with the higher ratios of starch to polyethylene for shaped articles of non-uniform cross section, such for example as ribbed tubing, of the type used to enclose active material as in that type of battery sold under the trademark "Ironclad." With a non-uniform cross section, the following treatment has been found suitable and will prevent the production of internal stresses of magnitude causing multiple rupture of the shaped articles which would, if present, render such articles useless for their intended purposes.

Specifically, the shaped articles of non-uniform cross section are first initially wetted, as by immersion in plain water or alternatively in an alkaline solution, about 2% sodium hydroxide, at a temperature not exceeding about 140° F. After immersion in such a solution for a substantial period of time, again depending upon the thickness of the articles being treated, the temperature of the bath is gradually raised over a period of an hour or so to about its boiling point. By the initial wetting at a low temperature, a controlled slow and uniform expansion of the starch is attained in avoidance of the disruptive effects mentioned above. Differential rates of swelling throughout an article of variable cross section of magnitude which produce multiple fractures do not occur. The shaped article throughout the process does have adequate strength safely to withstand the handling required and the stresses imposed thereon in performing the successive steps. After the starch-expanding operation, the next step is the starch removal. The starch removal may be conducted as described above and the subsequent steps performed depending upon the end use of the material.

Where there is no need for maximum porosity of the end product, the starch-expanding step is omitted. The shaped material is then immersed directly in the acid bath for removal of the starch. The aqueous acid bath will produce some swelling of the starch particles but the starch-removal rate exceeds the expansion rate and the end product is one having a porosity materially less than that produced by the performance of the starch-expanding step. Where fully expanded, the porosity is remarkably high for the higher ranges of starch to thermoplastic resin: for a 4:1 ratio it has been found to be approximately 95%.

The thermoplastic resin, polyethylene, has the property of existing at different temperatures in the crystalline and in the amorphous state. It may be, though experimental evidence is still lacking, that the transition from the amorphous to the crystalline state occurs during the swelling of the starch and this may account for the shrinkage characteristic and the higher porosity of the final product with the same ratio of starch to resin. Apparently the resin at the elevated softening temperature flows as the starch particles expand. There is a lack of elasticity during the expansion of the starch particles. There appears to be present a phenomenon in the nature of a viscous flow or deformation such as "cold flow" at elevated temperature, in contrast with the action which takes place with polyvinyl chloride resins. With them, the elasticity of the resin at elevated starch-swelling temperature appears to be retained.

While the present invention as thus far described is directed primarily to the production of the stock material and to the methods of treatment to produce microporous articles from the polyethylene thermoplastic resin, the same process can also be applied to any thermoplastic having the characteristic of adequate softening at a temperature below that which will carbonize the starch or decompose the resin for the envelopment or adsorption therein of the starch particles.

By producing the stock material and shaped articles therefrom without the use of any solvent or plasticizer, temporary or permanent, there is avoided possibility of chemical attack incident to remnant traces of the solvent which may remain either in the stock material or in the end product.

Removable solid fillers of the anhydrous type such as dry powdered sugar may be included in the mixture in quantity, 5% to 20% by weight, to relieve internal stresses for articles of non-uniform cross section. The powdered sugar, which may in some cases replace all of the starch, or other removable, soluble, filler is removed during the aqueous soaking period preceding the starch-swelling step.

What is claimed is:

1. The method of producing a thermoplastic stock for the production of microporous articles which comprises mixing and blending together finely divided starch and polyethylene which will at elevated temperature sufficiently soften in the absence of a plasticizer to coat the finely divided starch, during the blending of said starch and said resin applying at elevated temperature a continuing wiping action by differential rolls, said temperature range being from about 220° F. to 250° F., said wiping action under pressure being continued for a period adequate to produce substantially complete dispersal of the starch into the softened resin.

2. The method of producing a thermoplastic stock for the production of microporous articles which comprises mixing and blending together polyethylene and finely divided starch, during the blending applying at elevated temperature a continuing wiping action by differential rolls, said temperature being within the range of the softening temperature of polyethylene and below that which produces charring of the starch.

3. The method of producing a thermoplastic stock for the production of microporous articles which comprises mixing and blending together polyethylene and starch, during the blending applying at elevated temperature a continuing wiping action by differential rolls, said temperature range being from about 220° F. to 250° F., said wiping action being continued for a period adequate to produce substantially complete dispersal of the starch into the softened polyethylene.

4. The method of producing a thermoplastic stock for the production of microporous articles which comprises mixing and blending together polyethylene and finely divided starch in ratio of starch to polyethylene between 1:1 and 5:1, during the blending applying at elevated temperature a continuing wiping action by differential rolls, said temperature being within the range of the softening temperature of polyethylene and below that which produces charring of the starch.

5. The method of producing a thermoplastic stock for the production of microporous articles which comprises mixing and blending together polyethylene and starch in ratio of starch to polyethylene between 1:1 and 5:1, during the blending applying at elevated temperature a continuing wiping action by differential rolls, said temperature range being from about 230° F. to 250° F., said wiping action being continued for a period adequate to produce substantially complete dispersal of the starch into the softened polyethylene.

6. The method of producing a thermoplastic stock for the production of microporous articles which comprises mixing and blending together polyethylene and finely divided starch in ratio of starch to polyethylene of 4:1, during the blending applying at elevated temperature a continuing wiping action by differential rolls, said temperature being within the range of the softening temperature of polyethylene and below that which produces charring of the starch.

7. The method of producing a thermoplastic stock for the production of microporous articles which comprises mixing and blending together polyethylene and finely divided starch, during the blending applying at elevated temperature a continuing wiping action by differential rolls, said temperature being within the range of the softening temperature of polyethylene and below that which produces charring of the starch, shaping the mixture into an article, immersing it in an aqueous bath at a temperature below that which produces substantial expansion of the starch particles, thereafter elevating the temperature of said bath for expansion of the starch particles, and leaching the expanded starch particles from the mixture to produce microporosity of the shaped article.

8. The method of producing a thermoplastic stock for the production of microporous articles which comprises mixing and blending together polyethylene and finely divided starch, during the blending applying at elevated temperature a continuing wiping action by differential rolls, said temperature being within the range of the softening temperature of polyethylene and below that which produces charring of the starch, shaping the mixture into an article, immersing it in an aqueous bath at a temperature below that which produces substantial expansion of the starch particles, thereafter elevating the temperature for expansion of the starch particles and to raise the temperature of the resin to a value high enough for production of cold-flow thereof, and leaching the expanded starch particles from the mixture to produce microporosity of the shaped article.

9. The method of producing a thermoplastic stock for the production of microporous articles which comprises mixing and blending together an anhydrous finely divided soluble starch filler and polyethylene which will at elevated temperature in the absence of a plasticizer sufficiently soften to coat the finely divided starch, during the blending of said filler and said resin applying at elevated temperature a continuing wiping action by differential rolls, said temperature range being from about 220° F. to 250° F., said wiping action being continued for a period adequate to produce substantially complete dispersal of said starch filler into said resin.

10. The method of producing a thermoplastic stock for the production of microporous articles which comprises mixing and blending together an anhydrous finely divided soluble starch filler and polyethylene which will at elevated temperature in the absence of a plasticizer sufficiently soften to coat the finely divided starch, during the blending of said filler and said resin applying at elevated temperature a continuing wiping action by differential rolls, said temperature range being from about 220° F. to 250° F., said wiping action being continued for a period adequate to produce substantially complete dispersal of said starch filler into said resin, shaping the blended mixture into an article, immersing it in a bath in which said filler is soluble to provide some porosity throughout the shaped article, and thereafter immersing said shaped article in a bath producing expansion of the finely divided starch without developing forces within the article of sufficient magnitude to produce structure-destroying rupture thereof.

11. The method of producing a thermoplastic stock for the production of microporous articles which comprises mixing and blending together finely divided starch particles and polyethylene which will at elevated temperature in the absence of a plasticizer sufficiently soften to coat the finely divided starch, during the blending of said starch and said resin applying at elevated temperature a continuous wiping action by differential rolls, said temperature range initially being from about 220° F. to 250° F., said wiping action being continued for a period adequate to produce substantially complete dispersal of the starch into the softened resin, continuing said mixing to reduce the moisture present and then gradually increasing the temperature during continued mixing further to reduce the water present as water-of-association, the temperature being elevated to a value which produces partial dextrinization of starch particles to produce soluble dextrinized particles, thereby preparing them for removal prior to swelling of the starch particles.

12. The method of producing a thermoplastic stock for the production of microporous articles which comprises mixing and blending together polyethylene and finely divided starch, during the blending applying at elevated temperature a continuing wiping action by differential rolls, said temperature being within the range of from about 220° F. to about 250° F. for removal of moisture and to soften the polyethylene for dispersal therethrough of the starch, subsequently elevating the temperature of the mixture partially to convert particles of starch to a soluble state for their removal in a bath which does not produce substantial expansion of the starch particles.

References Cited in the file of this patent

UNITED STATES PATENTS

| Number | Name | Date |
|---|---|---|
| 2,384,070 | Bolton | Sept. 4, 1945 |
| 2,588,362 | Danison | Mar. 11, 1952 |

FOREIGN PATENTS

| Number | Country | Date |
|---|---|---|
| 576,659 | Great Britain | Apr. 15, 1946 |

OTHER REFERENCES

Bostwick Industrial and Engineering Chemistry, May 1950, pages 848–849.